(12) United States Patent
Chau

(10) Patent No.: US 6,860,992 B2
(45) Date of Patent: Mar. 1, 2005

(54) RESERVOIR WATER TREATMENT

(76) Inventor: Yiu Chau Chau, 80 West Beaver Creek Road, Unit 14, Richmond Hills, Ontario (CA), L4B 1H3

(*) Notice: Subject to any disclaimer, the term of this patent is extended or adjusted under 35 U.S.C. 154(b) by 328 days.

(21) Appl. No.: 10/083,735

(22) Filed: Feb. 26, 2002

(65) Prior Publication Data

US 2003/0159979 A1 Aug. 28, 2003

(51) Int. Cl.[7] .................................................. C02F 9/00
(52) U.S. Cl. ...................... 210/251; 99/290; 210/257.1; 210/282; 210/283; 210/284
(58) Field of Search .............................. 210/251, 257.1, 210/282, 283, 284; 99/290

(56) References Cited

U.S. PATENT DOCUMENTS 146,590 A * 1/1874 Heinz ........................ 210/266
4,749,481 A * 6/1988 Wheatley .................... 210/282
5,076,922 A * 12/1991 DeAre ........................ 210/282

* cited by examiner

Primary Examiner—Ivars C. Cintins
(74) Attorney, Agent, or Firm—Cook, Alex, McFarron, Manzo, Cummings & Mehler, Ltd.

(57) ABSTRACT

A water treatment unit for treating water in a reservoir of a coffee maker or a container water treatment system. The water treatment unit has several particulate finely divided water treatment media therein and it includes a housing which has transverse dimensions which are substantially greater than its height to cause the water to flow through the housing and the media therein in a transverse direction. Such transverse flow results in a substantially reduced pressure drop across the media with an increased water flow rate which permits a substantial reduction in size or elimination of one of two water reservoirs.

26 Claims, 5 Drawing Sheets

RESERVOIR WATER TREATMENT

BACKGROUND AND SUMMARY OF THE INVENTION

The present invention is directed to a water treatment unit, and more particularly, to a water treatment unit for treating water in a water reservoir such as a coffee maker or water treatment container.

Water treatment systems have been employed in the past for the treatment of water in coffee makers and containers for holding and dispensing the treated water to remove various impurities and contaminants from the water. These systems have included, for example, water treatment units containing particulate activated granular carbon for the removal of various contaminants including odors, undesirable flavors and the like. In these prior units the particulate granulated carbon is positioned in the housing of the water treatment unit in the form of a bed, and the water to be treated flows vertically through the bed by gravity until all of the water which is to be treated has been treated.

In the case of a coffee maker, the typical coffee maker includes a reservoir or compartment into which the untreated water is poured in a volume amount which approximates the volume of coffee which is to be brewed in that batch. The water treatment unit in such coffee makers is typically located at the bottom of the untreated water compartment, and an additional compartment or reservoir is positioned beneath the water treatment unit and untreated water reservoir to accumulate sufficient treated water before any water is heated and transmitted to the brewing compartment which contains the filter and the ground coffee for brewing the batch of coffee. The treated water reservoir is of considerable size and is necessitated by the fact that the flow rate and pressure drop across the vertical flow water treatment media bed in the water treatment unit results in the treatment being rather slow and much slower than the rate at which the water can be processed in the brewing compartment.

In the case of container water treatment systems for the treatment, holding and dispensing of treated water for ongoing use, such as a pitcher or other container for holding in a kitchen refrigerator, untreated and treated reservoirs or compartments are also typically provided. In these container treatment systems the water treatment unit is typically positioned in the bottom of the untreated water compartment so that the water flows vertically by gravity down through the unit and its particulate activated carbon granular treatment bed. The water drains from the untreated water compartment through the unit and its bed of water treatment medium, and to the treated water compartment where the treated water is held for future use and dispensing as needed. In these systems the untreated and treated water compartments are approximately similar in volumetric capacity because, due to the relativity high pressure drop and slow rate of flow through the water treatment bed, the upper unfiltered water compartment must approximate the size of the lower treated water compartment to permit the user to simply add the amount of water to be treated to the untreated water compartment in one fast pour without having to wait for the water to pass through the treatment unit.

It would be desirable if at least one of these untreated or treated water reservoirs or compartments could be substantially reduced in size or eliminated altogether. This would result in a substantial reduction in the size of such coffee makers or container treatment systems without a reduction in the capacity. In an attempt to realize this result in a prior coffee maker system, the treated water reservoir or compartment has been substantially reduced in size by bypassing some of the untreated water around the water treatment unit and passing it directly to the brewing compartment. This bypassed water together with the flow through the treatment unit is sufficient to satisfy the brewing rate without the need for a treated water reservoir of substantive size. However, it has the disadvantage that a substantial portion of the water in the final brewed product is untreated.

In the present invention such reduction in size and/or elimination of reservoirs or compartments is possible without a sacrifice of treatment quality in the final product because the water treatment unit of the present invention enjoys a substantially reduced pressure drop and substantially increased flow rate through the treatment unit which make possible a flow rate through the water treatment unit which is extremely high.

In the present invention multi-treatment media and/or multi-stages may also be accommodated in the water treatment unit and these media may be separated from each other to avoid intermingling with each other without a sacrifice in the high flow rate of the water. Moreover, in the water treatment unit of the present invention the distance of flow through a given media is always the same which results in a uniform high flow rate and minimum pressure drop, and channeling in the treatment media is substantially reduced if not eliminated all together. Also, in the preferred unit of the present invention partially treated water may be thoroughly intermixed following initial treatment and before final polishing to improve the uniformity and quality of the final treated water.

In one principal aspect of the present invention, a water treatment unit comprises a housing having transverse dimensions and a height, with the transverse dimensions being substantially greater than the height of the housing. A substantially vertical outer wall extends around and defines the perimeter of the housing, and at least one substantially vertical inner wall in the housing is spaced from the outer wall to define a chamber between the inner and outer walls. A plurality of openings are in the outer and inner walls and are constructed and arranged to direct water to flow in a substantially transverse direction through the chamber. A bottom wall on the housing closes the bottom of the housing at least at the chamber between the inner and outer walls, a top wall closes the top of the housing and the chamber between the inner and outer walls, and a discharge from the housing is located within the inner wall. A finely divided water treatment medium is positioned in the chamber so that the water flows transversely through the finely divided medium.

In another principal aspect of the present invention, at least two inner walls are in the housing, one of the inner walls and the outer wall define a first chamber therebetween, the two inner walls define a second chamber therebetween, and the second inner wall defines a third chamber. Particulate media is located in at least the first and second chambers, and a plurality of openings in each of the walls permits water to flow in a substantially transverse direction through the first and second chambers and the particulate media therein and into the third chamber.

In still another principal aspect of the present invention, the third chamber is substantially devoid of water treatment media and the water which has flowed transversely through the media in the first and second chambers is mixed in the third chamber.

In still another principal aspect of the present invention, the housing includes a vent which communicates with the third chamber to vent air.

In still another principal aspect of the present invention, a second housing depends downwardly from the first housing and defines a chamber in the discharge, the second housing having a discharge to discharge the water from the chamber in the second housing.

In still another principal aspect of the present invention, the particulate water treatment media in the first and second chambers comprises one or more of a finely divided metal and/or carbon.

In still another principal aspect of the present invention, the chamber of the second housing also contains a particulate water treatment medium, and the particulate water treatment medium in the chamber of the second housing comprises a finely divided carbon or a finely divided resin.

In still another principal aspect of the present invention, the bottom wall of the housing also closes the first mentioned housing to the chamber in the second housing, the bottom wall having first and second openings therein, the first opening communicating with the chamber in the second housing and the second opening bypassing the chamber in the second housing. A valve is operable to a first position for opening the first opening and blocking the second opening, and to a second position for opening the second opening and blocking the first opening.

In still another principal aspect of the present invention, a coffee maker comprises a reservoir for containing a volume of untreated water sufficient to brew a similar desired volume of coffee, and a brewing compartment, wherein the improvement comprises the aforementioned water treatment unit positioned in the bottom of the reservoir and discharging the water treated by the unit directly to the brewing compartment without any substantial holding of the treated water after treatment by the water treatment unit and before discharge to the brewing compartment.

In still another principal aspect of the present invention, a container for treating and holding water comprises an untreated water reservoir for receiving untreated water, and the untreated water reservoir includes an inlet for receiving untreated water to be treated. The aforementioned water treatment unit is positioned in the bottom of the untreated water reservoir and receives untreated water therefrom to treat the untreated water. A treated water reservoir receives the water which has been treated by the water treatment unit, and the treated water reservoir is substantially larger in volume than the untreated water reservoir.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENTS

Figure 1:
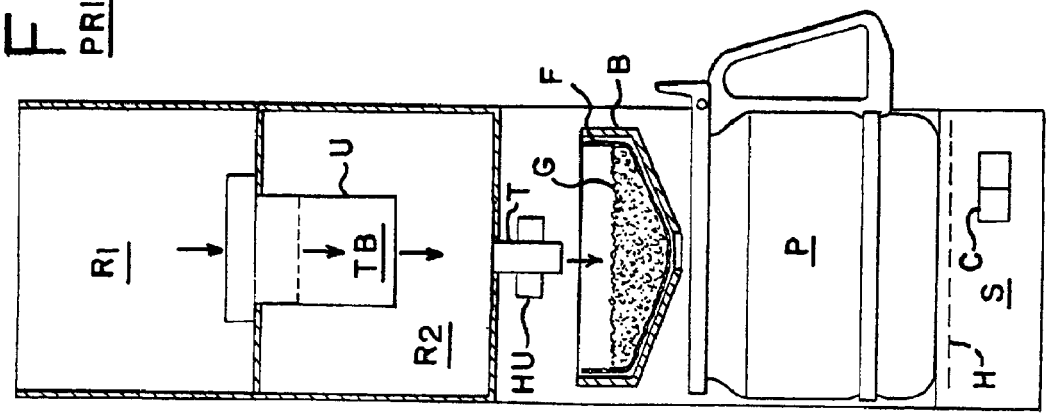
FIG. 1 is a schematic view of one embodiment of a coffee maker of the prior art having large untreated and treated water reservoirs or compartments.

One embodiment of prior art coffee maker as previously discussed is schematically shown in FIG. 1. The coffee maker in FIG. 1 generally includes an untreated water reservoir $R_1$, a treated water reservoir $R_2$, a coffee brewing compartment B and a pot P in which the brewed coffee is collected. The coffee maker also typically includes a stand S with a control switch C for controlling the operation of the coffee maker, and an electric heating coil H for keeping the brewed coffee hot after it has been brewed. In the case of the prior art coffee maker shown in FIG. 1, a conduit or tube T communicates treated water from the bottom of the reservoir $R_2$ to the brewing compartment B, the latter of which is typically generally cone shaped and holds a paper filter F which contains the coffee grounds G. As the treated water passes through the tube T it is heated by a heating unit HU so that hot water is discharged to the coffee grounds G in the brewing compartment B to brew the coffee. The heating unit HU may be the same unit as the heater H in the base of the unit with the tube T passing downward through the base and then back upward again to discharge into the brewing compartment B. In the alternative, the heating unit HU maybe a separate unit onto itself.

As previously discussed, the water treatment unit U in the prior art coffee maker shown in FIG. 1 typically contains a bed of particulate water treatment media TB, such as activated charcoal, through which the water vertically passes by gravity as shown by the arrows. Due to the fact that the treatment bed is generally of substantial depth and the flow through the bed is vertical, there is a substantial pressure drop across the bed. Thus, when a volume of water is poured into the unfiltered water reservoir $R_1$ it only flows from that reservoir through the bed at a relatively slow flow rate due to the pressure drop across the treatment bed TB. This flow rate is generally not sufficient to supply treated water to the brewing compartment at a rate which is sufficient to keep up with the requisite brewing rate. Thus, the filtered water reservoir $R_2$ is provided, as shown in FIG. 1, which is of substantial size to provide for the collection of treated water before the brewing cycle begins so that when it is time to commence brewing, a sufficient amount of treated water is available to meet the brewing flow rate.

Figure 2:
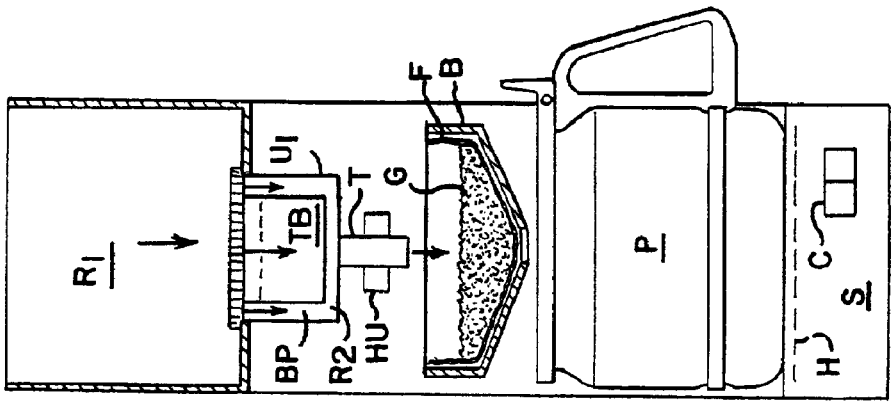
FIG. 2 is a schematic view of another embodiment of coffee maker of the prior art in which the filtered water reservoir has been substantially reduced in size by bypassing water around the treatment unit.

In an effort to substantially reduce in size of or eliminate the treated water reservoir $R_2$, a bypass embodiment of coffee maker has also been previously employed. One such bypass prior art coffee maker is schematically shown in FIG. 2 in which it will be seen that the treated water compartment $R_2$ is substantially reduced in size as compared to the treated water compartment shown in FIG. 1. This is made possible by a treatment unit $U_1$ in which untreated water is bypassed around the treatment bed TB through a bypass BP directly form the untreated water compartment $R_1$ to the tube T and onto the brewing compartment B together with some treated water which passes through the conventional vertical flow treatment bed TB. Thus, in this arrangement the treated water flow rate, which itself is insufficient to keep up with the brewing flow rate, is supplemented by untreated water which is bypassed through the bypass BP. This total flow is sufficient to result in a water flow rate which is able to keep up with the brewing rate. Of course as previously mentioned, the quality of the finally brewed coffee which is collected in the pot P is inferior because it contains a rather large amount of untreated bypassed water.

Figure 3:
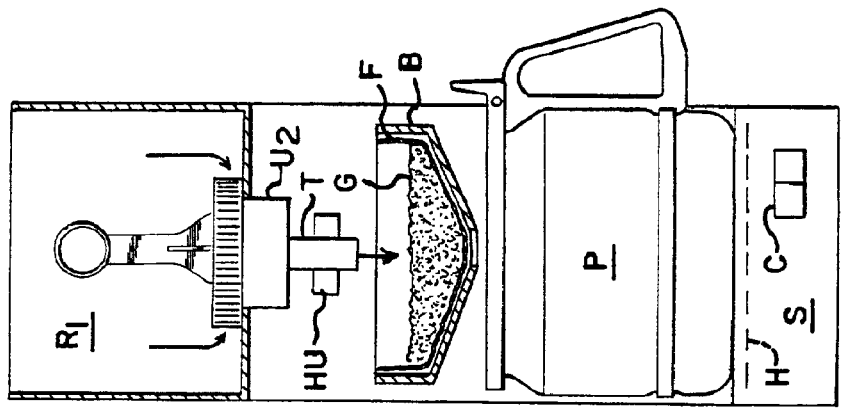
FIG. 3 is a schematic view of a preferred embodiment of coffee maker of the present invention.

A coffee maker in accordance with the present invention is schematically shown in FIG. 3. In the coffee maker of the present invention the treatment unit $U_2$ is constructed and arranged in a manner to provide for the treatment of the water which is introduced to the reservoir $R_1$ at a treatment flow rate which is more than sufficient to keep up with the brewing rate. Thus, in the present invention not only is a treated water reservoir $R_2$ substantially reduced in size if not eliminated altogether, but the quality of the finally brewed coffee is substantially enhanced because all of the water used to brew that coffee has been treated.

Figure 4:
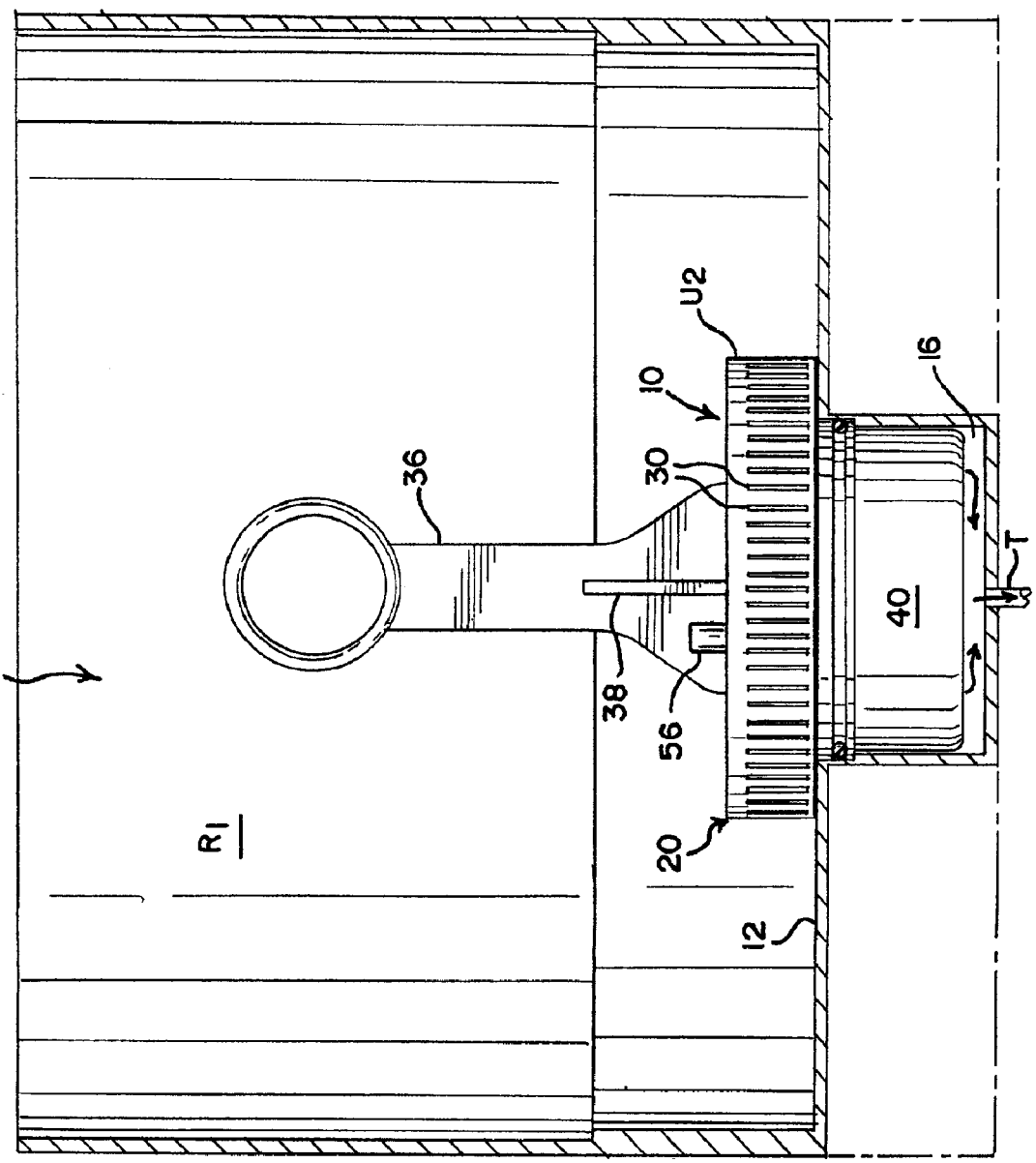
FIG. 4 is a detailed, partially cross-sectioned elevation view of a preferred embodiment of water treatment unit of the present invention positioned in the unfiltered water reservoir of a coffee maker.

A preferred embodiment of water treatment unit $U_2$ of the present invention is shown as 10 in FIGS. 3–6, which is particularly suitable for use in the coffee maker of the invention as shown in FIG. 3. As shown in FIGS. 3 and 4, the water treatment unit 10 is installed in the bottom 12 of a conventional untreated water reservoir $R_1$ of a coffee maker. The untreated water reservoir $R_1$ is sufficiently large to contain the largest volume of water which is needed to brew the largest volume of coffee which might be brewed in the coffee maker. However, the volume of water which is introduced to the reservoir $R_1$ need only be as large as needed for any given batch of coffee.

The bottom 12 of the reservoir preferably includes a cup shaped recess 16 to receive a portion of the water treatment unit 10 as shown in FIG. 4 and as will be described later. As the treated water leaves the water treatment unit 10 in the present invention, it will pass to the brew compartment B of the coffee maker through the tube T via a heating unit HU as shown in FIG. 3. Also as previously mentioned, the hearing unit HU may actually be the heater H shown in FIG. 3.

Figures 5, 6:
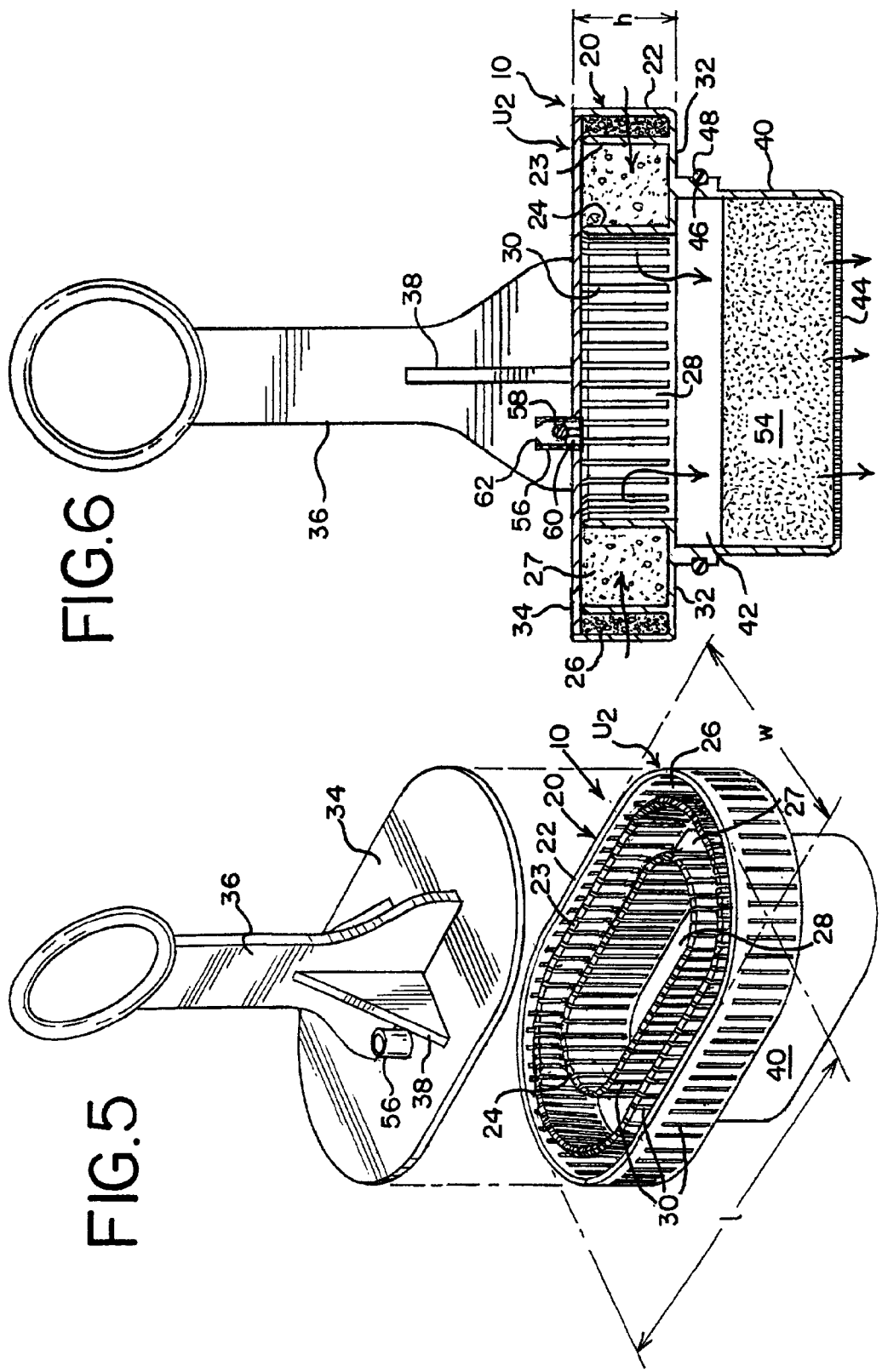
FIG. 5 is a detailed exploded perspective view of the water treatment unit of FIG. 4.
FIG. 6 is a detailed cross-sectioned elevation view of the water treatment unit of FIG. 4 and containing treatment media therein.

The water treatment unit 10 of the present invention includes a housing 20 which is defined by several generally concentrically arranged spaced walls 22, 23 and 24 as best seen in FIGS. 5 and 6. Each of the walls defines a plurality of chambers 26, 27 and 28 as shown in FIGS. 5 and 6. The outer wall 22 preferably defines the outer perimeter of the housing 20 and together with wall 23 defines chamber 26. Walls 23 and 24 define chamber 27 therebetween, and chamber 28 is defined within wall 24. Each of the walls 22, 23 and 24 includes a plurality of openings preferably in the form of spaced vertical slots 30 to permit the passage of water transversely through the chambers 26, 27 and 28 and their contents if any. However, the width of the slots 30 is sufficiently small to retain whatever contents are in the chambers. The transverse dimensions of the housing 20, i.e. the width w and length l, are substantially greater than the height h of the housing which results in the transverse flow of the water to be treated through the housing, as shown by the arrows in FIG. 6, which is an important feature of the present invention.

The housing 20, as shown in FIGS. 5 and 6, also includes a bottom wall 32 which closes the bottom of chambers 26 and 27. In the embodiment shown in FIGS. 5 and 6, the bottom wall 32 does not extend entirely across the bottom of the housing 20 and, thus, the bottom of chamber 28 is open to form a discharge from the housing 20 of the water which has been treated therein.

The housing 20 is also closed at the top by a top cover wall 34 which is received into the top of housing 20 and preferably rests on the inner walls 23 and 24, as best seen in FIG. 6. The cover wall 34 also preferably includes a handle 36 for manipulating the water treatment unit 10 into and out of position in the bottom wall 12 and recess 16 of the reservoir $R_1$. The handle 36 is preferably reinforced by gussets 38. The top cover wall 34 is preferably permanently fixed into the top of housing 20, such as by a suitable adhesive, after the treatment media has been filled into the unit as will be discussed later.

A second housing 40 is also preferably integrally formed with the bottom wall 32 of the housing 20. The housing 40 extends downwardly from the housing 20, as viewed in the drawings, and is preferably cup shaped to define another chamber 42 therein. The bottom wall 44 of the housing 40 is preferably perforated to permit discharge of the treated water from the unit 10.

The top of the exterior of the housing 40 is preferably circumferentially grooved at 46, as best seen in FIGS. 4 and 6, to receive an O-ring 48 which seals the bottom housing 40 in the recess 16, and prevents bypass of untreated water from reservoir $R_1$ around the water treatment unit 10 to the tube T to the brewing compartment.

Although the water treatment unit 10 and its housings 20 and 40 are shown in a preferred form as oval in cross-section, they may take any one of a number of other geometric cross-sectional forms including circular, rectangular, etc.

At least two different treatment media may be accommodated in the chambers 26, 27 and 42 of the water treatment unit 10 which is to be employed in the coffee maker. A finely divided particulate metal 50 preferably fills chamber 26. Such finely divided particulate metal may be a brass alloy, e.g. copper and zinc as described in U.S. Pat. No. 5,599,454 to remove or kill any of the contaminants disclosed in that patent. A finely divided particulate granular activated carbon 52 preferably fills the chamber 27 as best seen in FIG. 6. Chamber 28 is preferably left unfilled to permit the treated water which has passed through the metal particles 50 and activated carbon 52 to thoroughly mix and attain a uniform state, before the water finally passes through the treatment media in chamber 42 for final polishing. Although the treatment media 54 in chamber 42 may be a different media from those in chambers 26 and 27, such as a resin for the removal of other specific undesirable impurities, in the coffee maker the medium 54 in chamber 42 is preferably also an activated carbon for final polishing of the water. Although certain resins may be desirable for some reasons as the medium in 54, it is not desirable to use resins which generate sodium or potassium compounds because potassium tends to make the brewed coffee bitter and sodium tends to make it sour.

What is important in the water treatment unit 10 of the present invention is that the unit is constructed and arranged to cause the water which is to be treated to move transversely and horizontally through the treatment media in housing 20. This results in substantially more cross-sectional area and less depth than in the conventional treatment units having a relatively deep bed of media through which the water passes downward vertically by gravity. As a result, the water treatment unit 10 of the present invention enjoys a substantially lower pressure drop through the unit which permits the water to be treated rapidly and thoroughly at a high flow rate and a flow rate which is high enough to meet the demand of the coffee brewing compartment without the need for an additional reservoir of treated water between the water treatment unit and the brewing compartment to supply that rate of demand. Moreover, because the treatment media particles are held in place by gravity during the treating operation, channeling and bypassing of the water being treated are substantially reduced resulting in a high efficiency and thorough treatment. These advantages are not lost by virtue of the vertical flow through the medium 54 because the medium 54 also has a large surface area and a shallow depth.

In the water treatment unit 10 of the coffee maker a vent 56 preferably is provided in the top cover wall 34, as shown in FIGS. 4–6. The vent 56 communicates with the chamber 28 in the unit. The vent 56 comprises a valve ball 58, as best seen in FIG. 6. The ball 58 is formed of a material which is heavier than air, but lighter than water. The valve ball 58 normally rests on a plurality of spaced vanes 60 which permit any air in chamber 28 to pass upwardly around the valve ball 58 as the water treatment unit 10 commences operation. Once the water treatment unit is completely filled with water during operation, the valve ball 58 will float upwardly and seat against the valve seat 62 at the top of the vent to close the vent.

Figure 7:
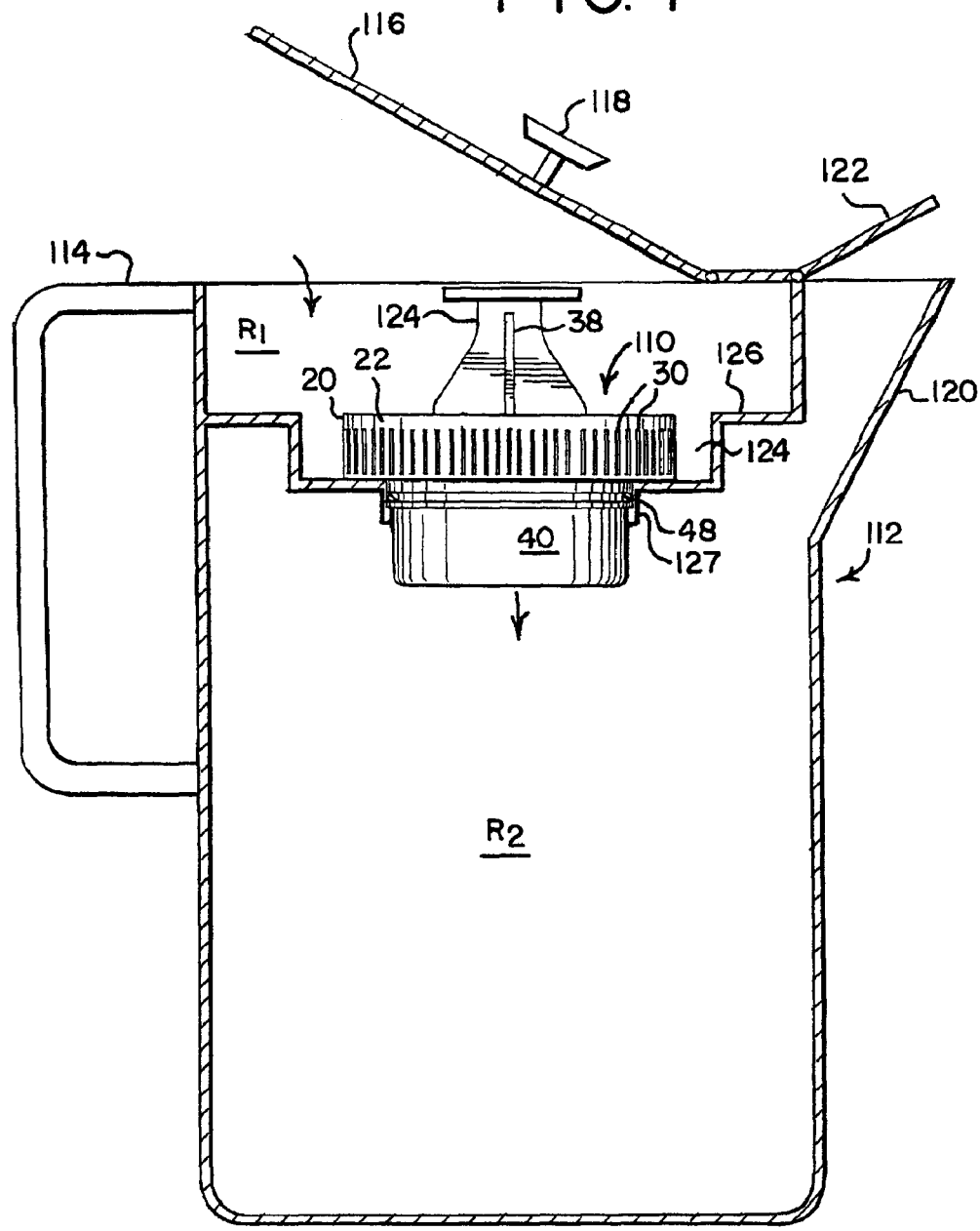
FIG. 7 is a cross-sectioned elevation view of a water treatment pitcher incorporating a preferred embodiment of the water treatment unit of the present invention.
Figure 9:
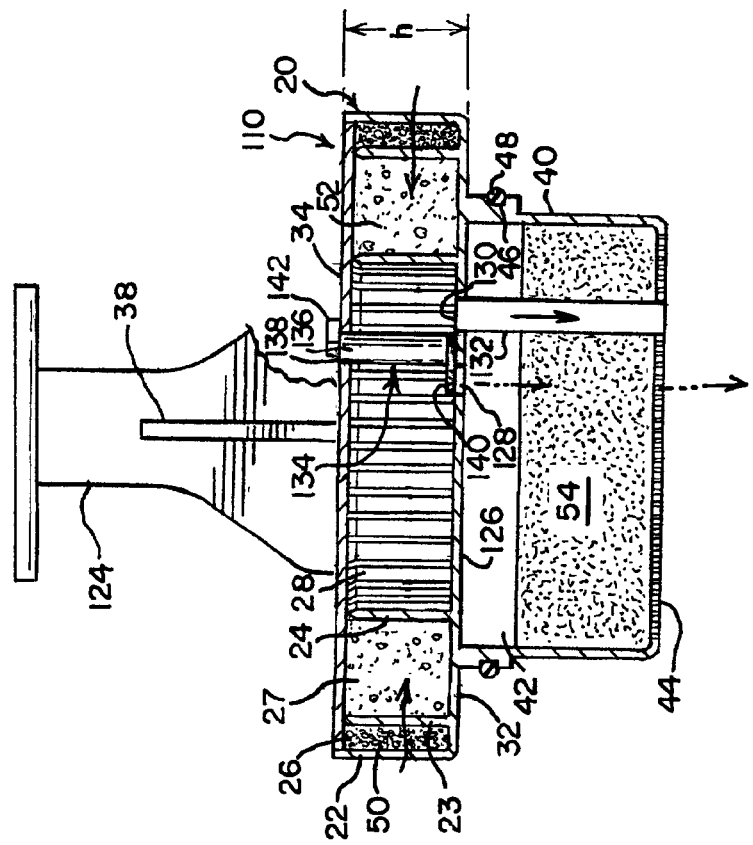
FIG. 9 is a detailed cross-sectioned elevation view of the water treatment unit of FIG. 7 and containing treatment media therein.
Figure 8:
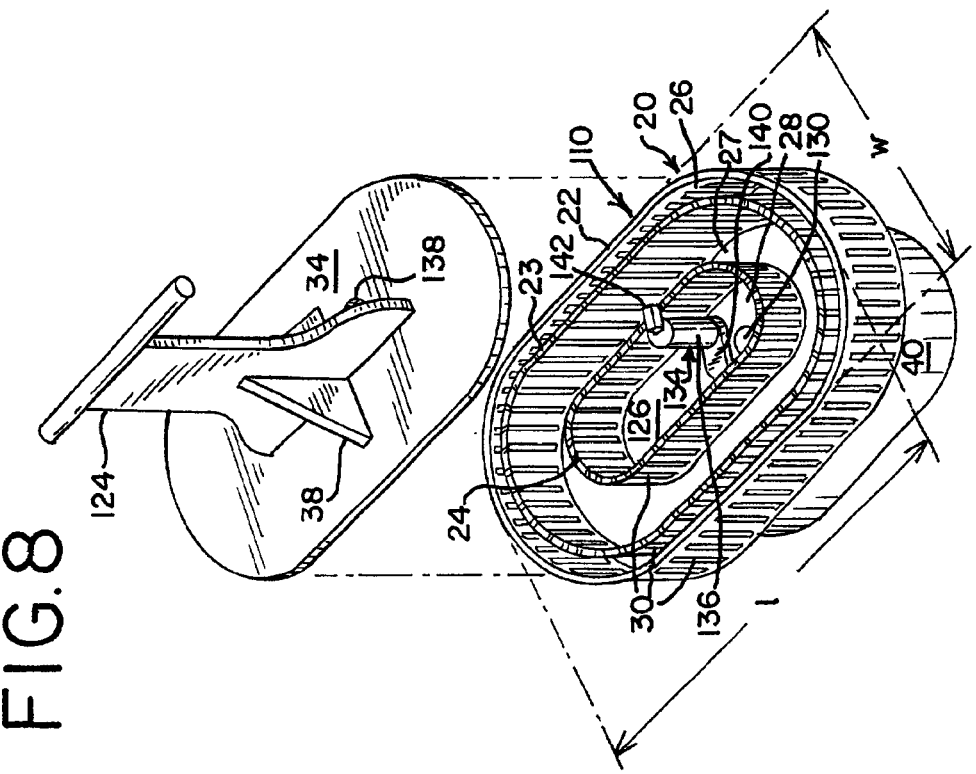
FIG. 8 is a detailed exploded perspective view of the water treatment unit of FIG. 7.

In FIGS. 7–9 a container water treatment system is shown which has a water treatment unit 110 which is essentially identical in construction to the water treatment unit 10 previously described for the coffee maker with a few exceptions to be explained to follow. Because of such substantial identity of components, like reference numerals have been used to designate like components.

As shown in FIG. 7, a container is provided preferably in the form of a pitcher 112 with a handle 114. In the alternative the container may take the form of a rectangular cubic box shaped structure for relatively stationary placement in the compartment of a refrigerator and without a handle for transportability. Instead of pouring the treated water as in the pitcher, treated water may be removed from the cubic container by a spigot.

In the container water treatment system such as the pitcher 112, a relatively small untreated water reservoir $R_1$ is provided at the top of the pitcher and a much larger treated water reservoir $R_2$ is at the bottom of the pitcher. The pitcher 112 also preferably includes a hinged lid 116 covering the untreated water reservoir $R_1$. The lid 116 may be opened and closed with a suitable knob 118 to open the reservoir $R_1$ to permit pouring in of the water to be treated. The pitcher 112 also preferably includes a spout 120 from which treated water maybe dispensed as desired from the treated water reservoir $R_2$. The spout 120 also is preferably covered with a hinged lid 122 which automatically opens when the pitcher is tilted for dispensing the water from the treated water reservoir $R_2$.

The untreated water reservoir $R_1$ may be made quite small in the present invention due to the high flow rate through the water treatment unit 110 as previously discussed. Thus, for a given overall pitcher size, more of the pitcher maybe devoted to the desired product, i.e. the treated water in reservoir $R_2$. The untreated water reservoir $R_1$ preferably includes a recess 124 in its bottom 126 as best seen in FIG. 7. The vertical walls of the recess 124 are preferably slightly separated from the outer wall 22 of the water treatment unit 110 by a distance so as not to impair the flow through the outer wall 22 but to minimize the volume immediately surrounding the outer wall 22. Because of this recess, when water is poured into the reservoir $R_1$ it flows at a substantially constant flow rate through the media in the water treatment unit 110 because the pressure head on the water is substantially identical until the water level reaches the top of the housing 20 of the water treatment unit. At that point in time, only a few percent of the total volume of water in reservoir $R_1$ remains so that only the last bit of water that flows through the water treatment unit 110 may have a slower flow rate.

A collar 127 also depends downwardly from the bottom of the recess 124 to closely surround the top of the housing 40 and provide a seal with the O-ring 48. This prevents untreated water in the reservoir $R_1$ from bypassing the water treatment unit 110 into the treated water reservoir $R_2$.

In the coffee maker which has earlier been described, the largest reservoir is the untreated water reservoir $R_1$, whereas in the water treatment container of FIGS. 7–9, the largest reservoir is the treated water product reservoir $R_2$ and the smallest is the untreated water reservoir $R_1$. In view of this the depth of the untreated water reservoir $R_1$ is substantially less than the untreated water reservoir $R_1$ in the coffee maker. Accordingly, the handle 114 on the top cover wall 34 is preferably substantially shortened in order to provide clearance for the closed lid 116.

In the water treatment container show in FIGS. 7–9, the vent 56 as described for the coffee maker is not typically needed. This is because the large capacity of the treated water reservoir $R_2$ is capable of accommodating any air that may be initially trapped in chamber 28 and the air may be readily expelled from the spout 120 which opens to the reservoir $R_2$.

The water treatment media 50 and 52 in the water treatment unit 110 are preferably the same as those previously described with respect to the coffee maker, i.e. metal particles 50 and activated carbon granules 52. The water treatment medium 54 in chamber 42 may also be a finely divided particulate activated carbon as in the coffee maker. However, the water treatment medium 54 in the water treatment container system is preferably a finely divided, particulate resin capable of changing the calcium salts which cause hardness in the water to sodium or potassium salts. This softening of the water is particularly preferred where the treated water from the pitcher 112 is to be heated. Conversely, however, it is preferred for health reasons that where the treated water is simply to be consumed as unheated drinking water, the treated water should remain in its hardened calcium salt state, rather than be softened to sodium or potassium salts.

In this regard a feature is shown in FIGS. 8 and 9 for the water treatment container which need not be present in the water treatment unit of the coffee maker and which permits the selective direction of the water being treated either through the water treatment medium 54 in the housing 40 or in bypassing relationship to the water treatment medium 54 and directly into the treated water reservoir $R_2$.

In this regard, as best seen in FIGS. 8 and 9, the bottom of chamber 28 is also covered by a bottom wall 126. The bottom wall 126 includes two openings 128 and 130, as best seen in FIG. 9. One opening 128 when opened directs the water from the mixing chamber 128 after the initial treatment to the chamber 42 where it flows through the resin bed 54 and out through the openings 44 into the treated water reservoir $R_2$. Passage through the resin bed 54 will soften the water to potassium or sodium salts. Such softening is particularly suitable for further heating or cooking purposes to prevent scale. On the other hand when opening 128 is blocked and opening 130 is opened, the water in chamber 28 passes through the opening 130 and through a conduit 132 directly to the bottom of the housing 40 in bypassing relationship to the resin medium 54 in chamber 42. Thus, the water in reservoir $R_2$ in this instance is not softened and remains hard which is best for unheated consumption.

In order to selectively permit the opening and closing of the openings 128 and 130 a valve mechanism 134 is provided which comprises a vertical shaft 136 which extends generally over the height h of the housing 20 and through an opening 138 in the top wall cover 34. A flat valve link 140 is provided at the bottom of the shaft 136 which, when the shaft is rotated by the handle 142, will be rotated to either of two positions. In one of the positions, the valve link 140 closes the opening 128 and opens the opening 130 to bypass the particulate resin treating medium 54. In the other position, the valve link 140 closes the bypass opening 130 and opens the opening 128 to permit the water to also pass through the resin water treatment medium 54.

From the foregoing it will be appreciated that the present invention permits a substantial reduction in size and/or increase in functional capacity of a system which requires reservoirs to contain untreated and/or treated water in a water treatment system by eliminating the need for or substantially reducing the need for capacity of one of the reservoirs. This is accomplished by transverse flow of water through one or more finally divided particulate medium which substantially reduces pressure drop and increases the flow rate of the water. Moreover, the treated water is thoroughly intermixed before final polishing to improve the uniformity and quality of the final treated water, and channeling in the treatment media is also substantially reduced if not eliminated altogether.

It will be understood that the preferred embodiments of the present invention which have been described are merely a illustrative of the principles of the present invention. Numerous modifications may be made by those skilled in the art without departing from the true spirit in scope of the invention.

I claim:

1. A water treatment unit, comprising
    a first housing having transverse dimensions and a height, said transverse dimensions being substantially greater than the height of said housing;
    a substantially vertical outer wall extending around and defining the perimeter of said first housing;
    at least one substantially vertical inner wall in said first housing spaced from said outer wall and defining a chamber between said inner and outer walls;
    a plurality of openings in said outer and inner walls constructed and arranged to direct water to flow in a substantially transverse direction through said chamber;
    a bottom wall on said first housing closing the bottom of said first housing at least at said chamber between said inner and outer walls;
    a top wall closing the top of said first housing and said chamber between said inner and outer walls;
    a discharge from said first housing and within said inner wall;
    a finely divided water treatment medium in said chamber and positioned therein so that the water flows transversely through said finely divided medium; and
    a second housing which depends downwardly from said first housing and defines a chamber in said discharge, said second housing having a discharge to discharge the water from said chamber in said second housing.

2. The unit of claim 1, including at least two inner walls in said first housing, one of said inner walls and said outer wall defining a first chamber therebetween, said two inner walls defining a second chamber therebetween, and said second inner wall defining a third chamber; and a plurality of openings in each of said walls to permit water to flow in a substantially transverse direction through said first and second chambers and into said third chamber.

3. The unit of claim 2, wherein said first and second chambers each contain a finely divided particulate water treatment media and the water flows transversely through the particulate media in each said chamber.

4. The unit of claim 3, wherein said particulate water treatment media comprises one or more of a finely divided metal and/or carbon.

5. A coffee maker comprising a reservoir for containing a volume of untreated water sufficient to brew a similar desired volume of coffee, and a brewing compartment, wherein the improvement comprises the water treatment unit of claim 4 positioned in the bottom of said reservoir and discharging the water treated by said unit directly to the brewing compartment without any substantial holding of the treated water after treatment by the water treatment unit and before discharge to the brewing compartment.

6. A container for treating and holding water, comprising
    an untreated water reservoir for receiving untreated water, said untreated water reservoir including an inlet for receiving untreated water to be treated;
    the water treatment unit of claim 4 positioned in the bottom of said untreated water reservoir and receiving untreated water therefrom to treat the untreated water; and
    a treated water reservoir receiving the water which has been treated by said water treatment unit, said treated water reservoir being substantially larger in volume than said untreated water reservoir.

7. The unit of claim 3, wherein said third chamber is substantially devoid of water treatment media and the water which has flowed transversely through the media in said first and second chambers is mixed in said third chamber.

8. A coffee maker comprising a reservoir for containing a volume of untreated water sufficient to brew a similar desired volume of coffee, and a brewing compartment, wherein the improvement comprises the water treatment unit of claim 7 positioned in the bottom of said reservoir and discharging the water treated by said unit directly to the brewing compartment without any substantial holding of the treated water after treatment by the water treatment unit and before discharge to the brewing compartment.

9. A coffee maker comprising a reservoir for containing a volume of untreated water sufficient to brew a similar desired volume of coffee, and a brewing compartment, wherein the improvement comprises the water treatment unit of claim 2 positioned in the bottom of said reservoir and discharging the water treated by said unit directly to the brewing compartment without any substantial holding of the treated water after treatment by the water treatment unit and before discharge to the brewing compartment.

10. A container for treating and holding water, comprising
    an untreated water reservoir for receiving untreated water, said untreated water reservoir including an inlet for receiving untreated water to be treated;
    the water treatment unit of claim 2 positioned in the bottom of said untreated water reservoir and receiving untreated water therefrom to treat the untreated water; and
    a treated water reservoir receiving the water which has been treated by said water treatment unit, said treated water reservoir being substantially larger in volume than said untreated water reservoir.

11. The unit of claim 2, including a vent in said housing communicating with said third chamber to vent air from said third chamber.

12. The unit of claim 1, including at least two inner walls in said first mentioned housing, one of said inner walls and said outer wall defining a first chamber therebetween, said two inner walls defining a second chamber therebetween, and said second inner wall defining a third chamber which discharges to said chamber in said second housing; and a plurality of openings in each of said walls to permit water to flow in a substantially transverse direction through said first and second chambers and into said third chamber.

13. The unit of claim 12, wherein said first and second chambers each contain a finely divided particulate water treatment media and the water flows transversely through the media in each said chamber.

14. The unit of claim 13, wherein said particulate water treatment media comprises one or more of a finely divided metal and/or carbon.

15. The unit of claim 14, wherein said chamber of said second housing also contains a particulate water treatment medium.

16. The unit of claim 15, wherein said particulate water treatment medium in said chamber of said second housing comprises a finely divided carbon or a finely divided resin.

17. The unit of claim 16, wherein said bottom wall of said housing also closes said first mentioned housing to said chamber in said second housing, said bottom wall having first and second openings therein, said first opening communicating with said chamber in said second housing and said second opening bypassing said chamber in said second housing, and a valve operable to a first position for opening said first opening and blocking said second opening, and to a second position for opening said second opening and blocking said first opening.

18. A container for treating and holding water, comprising
an untreated water reservoir for receiving untreated water, said untreated water reservoir including an inlet for receiving untreated water to be treated;
the water treatment unit of claim 17 positioned in the bottom of said untreated water reservoir and receiving untreated water therefrom to treat the untreated water; and
a treated water reservoir receiving the water which has been treated by said water treatment unit, said treated water reservoir being substantially larger in volume than said untreated water reservoir.

19. A coffee maker comprising a reservoir for containing a volume of untreated water sufficient to brew a similar desired volume of coffee, and a brewing compartment, wherein the improvement comprises the water treatment unit of claim 15 positioned in the bottom of said reservoir and discharging the water treated by said unit directly to the brewing compartment without any substantial holding of the treated water after treatment by the water treatment unit and before discharge to the brewing compartment.

20. A container for treating and holding water, comprising
an untreated water reservoir for receiving untreated water, said untreated water reservoir including an inlet for receiving untreated water to be treated;
the water treatment unit of claim 15 positioned in the bottom of said untreated water reservoir and receiving untreated water therefrom to treat the untreated water; and
a treated water reservoir receiving the water which has been treated by said water treatment unit, said treated water reservoir being substantially larger in volume than said untreated water reservoir.

21. The unit of claim 13, wherein said third chamber is substantially devoid of water treatment media and the water which has flowed transversely through the media in said first and second chambers is mixed in said third chamber before it passes to said chamber in said second housing.

22. The unit of claim 1, wherein said bottom wall of said housing also closes said first mentioned housing to said chamber in said second housing, said bottom wall having first and second openings therein, said first opening communicating with said chamber in said second housing and said second opening bypassing said chamber in said second housing, and a valve operable to a first position for opening said first opening and blocking said second opening, and to a second position for opening said second opening and blocking said first opening.

23. A container for treating and holding water, comprising
an untreated water reservoir for receiving untreated water, said untreated water reservoir including an inlet for receiving untreated water to be treated;
the water treatment unit of claim 22 positioned in the bottom of said untreated water reservoir and receiving untreated water therefrom to treat the untreated water; and
a treated water reservoir receiving the water which has been treated by said water treatment unit, said treated water reservoir being substantially larger in volume than said untreated water reservoir.

24. A coffee maker comprising a reservoir for containing a volume of untreated water sufficient to brew a similar desired volume of coffee, and a brewing compartment, wherein the improvement comprises the water treatment unit of claim 1 positioned in the bottom of said reservoir and discharging the water treated by said unit directly to the brewing compartment without any substantial holding of the treated water after treatment by the water treatment unit and before discharge to the brewing compartment.

25. A container for treating and holding water, comprising
an untreated water reservoir for receiving untreated water, said untreated water reservoir including an inlet for receiving untreated water to be treated;
the water treatment unit of claim 1 positioned in the bottom of said untreated water reservoir and receiving untreated water therefrom to treat the untreated water; and
a treated water reservoir receiving the water which has been treated by said water treatment unit, said treated water reservoir being substantially larger in volume than said untreated water reservoir.

26. A water treatment unit, comprising
a housing having transverse dimensions and a height, said transverse dimensions being substantially greater than the height of said housing;
a substantially vertical outer wall extending around and defining the perimeter of said housing;
at least two substantially vertical inner walls in said housing, one of said inner walls and said outer wall defining a first chamber therebetween, said two inner walls defining a second chamber therebetween, and said second inner wall defining a third chamber; and a plurality of openings in each of said walls to permit water to flow in a substantially transverse direction through said first and second chambers and into said third chamber;
a bottom wall on said housing closing the bottom of said housing at least at said chamber between said inner and outer walls;
a top wall closing the top of said housing and said chamber between said inner and outer walls;
a discharge from said housing and within said inner wall;
a finely divided water treatment medium in said first and/or second chamber and positioned therein so that the water flows transversely through said finely divided medium; and
a vent through said top wall of said housing communicating with said third chamber to vent air from said third chamber.

* * * * *